（12）United States Patent
Lim et al.

(10) Patent No.: US 8,526,498 B2
(45) Date of Patent: Sep. 3, 2013

(54) VIDEO CODING APPARATUS, VIDEO CODING METHOD, AND VIDEO DECODING APPARATUS

(75) Inventors: Chong Soon Lim, Singapore (SG); Viktor Wahadaniah, Singapore (SG); Teo Han Boon, Singapore (SG); Youji Shibahara, Osaka (JP); Takahiro Nishi, Nara (JP); Toshiyasu Sugio, Osaka (JP); Kazuya Takagi, Osaka (JP)

(73) Assignee: Panasonic Corporation, Osaka (JP)

( * ) Notice: Subject to any disclaimer, the term of this patent is extended or adjusted under 35 U.S.C. 154(b) by 1418 days.

(21) Appl. No.: 12/027,404

(22) Filed: Feb. 7, 2008

(65) Prior Publication Data

US 2008/0291998 A1 Nov. 27, 2008

(30) Foreign Application Priority Data

Feb. 9, 2007 (JP) ................................. 2007-031154

(51) Int. Cl.
*H04B 1/66* (2006.01)
(52) U.S. Cl.
USPC ................................. 375/240.13; 375/240.24
(58) Field of Classification Search
USPC .................. 375/240, 240.01, 240.02, 240.04, 375/240.06, 240.12, 240.13, 240.16
See application file for complete search history.

(56) References Cited

U.S. PATENT DOCUMENTS

| | | | | |
|---|---|---|---|---|
| 6,037,988 A * | 3/2000 | Gu et al. | .................. | 375/240.16 |
| 6,064,776 A | 5/2000 | Kikuchi et al. | | |
| 6,215,822 B1 * | 4/2001 | Bose et al. | ............... | 375/240.16 |
| 6,438,165 B2 * | 8/2002 | Normile | ......................... | 375/240 |
| 6,535,558 B1 * | 3/2003 | Suzuki et al. | ............. | 375/240.12 |
| 7,346,217 B1 * | 3/2008 | Gold, Jr. | ......................... | 382/236 |
| 2005/0100092 A1 * | 5/2005 | Sekiguchi et al. | ........ | 375/240.12 |
| 2005/0265447 A1 * | 12/2005 | Park | ........................ | 375/240.03 |
| 2006/0203910 A1 * | 9/2006 | Kitada et al. | ............. | 375/240.12 |
| 2006/0204221 A1 * | 9/2006 | Uchida et al. | .................... | 386/95 |
| 2006/0215759 A1 * | 9/2006 | Mori | ........................ | 375/240.16 |
| 2006/0222078 A1 * | 10/2006 | Raveendran | ............. | 375/240.16 |
| 2007/0014347 A1 * | 1/2007 | Prechtl et al. | ............. | 375/240.01 |

FOREIGN PATENT DOCUMENTS

| | | |
|---|---|---|
| GB | 2 280 811 | 2/1995 |
| JP | 7-154754 | 6/1995 |
| JP | 9-130648 | 5/1997 |
| JP | 10-341436 | 12/1998 |
| JP | 2004-180344 | 6/2004 |

\* cited by examiner

*Primary Examiner* — Hoon J Chung
*Assistant Examiner* — Curtis A Alia
(74) *Attorney, Agent, or Firm* — Wenderoth, Lind & Ponack, L.L.P.

(57) ABSTRACT

A video coding apparatus is provided to reduce pulsing artifacts. The video coding apparatus includes a correlation calculation unit calculating a correlation value indicating a correlation degree of correlation between: a first block; and a second block or a third block. The first block includes pixels included in a first original picture in an original picture sequence of original pictures, the second block includes pixels included in a second original picture which precedes the first original picture, and the third block is obtained by coding and reconstructing the second block. The video coding apparatus also includes a correlation judgment unit judging whether the correlation value exceeds a first threshold, and judging that the correlation is high when the correlation value exceeds the first threshold, and includes a blending unit blending the first block and the third block when the correlation judgment unit judges that the correlation is high.

20 Claims, 11 Drawing Sheets

FIG. 1 Diagram illustrating example of pulsing artifact in coded video sequence

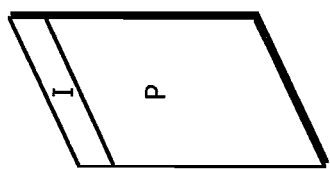
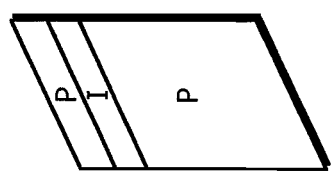
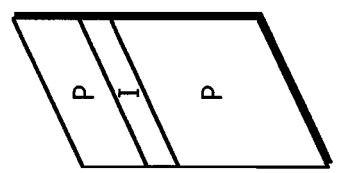
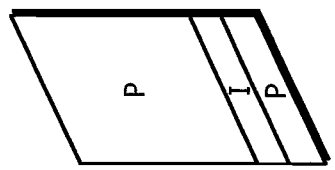
FIG. 11

VIDEO CODING APPARATUS, VIDEO CODING METHOD, AND VIDEO DECODING APPARATUS

BACKGROUND OF THE INVENTION (1) Field of the Invention

The present invention relates to a video coding apparatus, a video coding method and a video decoding apparatus for reducing pulsing artifacts which occur, at the time when various multimedia data are coded, and especially at the time when intra-picture coding is used for coding video.

(2) Description of the Related Art

In general, most video coding algorithms, such as the ISO/IEC 14496-2 Part 10 International Standard, code an intra-picture, which is also known as a key picture, at the start of each group of consecutive inter-predicted pictures. An intra-coded picture is a self-contained picture which does not depend on neighbouring pictures to be decoded. The intra-coded picture is sometimes used as an access point for a video decoder to independently decode a specific group of pictures (GOP) which includes the intra-picture and the inter-predicted pictures following the intra-coded picture without causing the decoder to decode pictures prior to the intra-coded picture in the compressed video stream. A coded video sequence is sometimes made up of several groups of pictures to facilitate random access and decoding of a portion of the coded video sequence.

The "pulsing" effect is an artifact that occurs when the coding quality of an intra-picture is different from that of the inter-pictures coded prior to the intra-picture. In another words, this artifact occurs at the transition part of one group of pictures to another group of pictures. For a coded video sequence that is made up of groups of pictures, this artifact appears like a "pulse" at every group of pictures interval due to a different intra-picture quality. The pulsing effect is more noticeable at a region of a picture with small motion activities especially in the case where the video sequence is coded at very high compression rate. FIG. 1 shows some examples of where pulsing artifacts occur in a video sequence. As shown in the figure, pulsing artifacts occurs at the GOP boundary between two different GOPs.

To reduce this pulsing effect, one prior art is to use a rate control algorithm to control the quality of the intra-picture. This pulsing effect is usually caused when the intra-picture is over compressed. Thus, one method to reduce this pulsing effect is to reduce the compression ratio for the intra-picture while increasing the compression ratio for the inter-pictures.

In addition, Patent Reference 1 (Japanese unexamined Patent Application Publication No. 9-130648) discloses a technique for reducing artifacts by executing filtering in a temporal direction after an image, including artifacts such as pulsing which occur in coding, is decoded.

However, the problem with the prior art is that an increase in the compression ratio reduces the quality of the inter-pictures, resulting in the increase of other artifacts such as blocking and ringing. In other words, the problem with the prior art is that it is impossible to improve the visual quality of pictures because other artifacts increase even in the case where pulsing artifacts decrease.

Pulsing effect is a noticeable artifact which occurs in a video compressed at a high compression ratio using a video coding algorithm such as the ISO/IEC 14496-2 Part 10 International Standard. In order to improve the picture quality of the compressed video, this artifact needs to be reduced either prior to the coding or after the decoding of the video. The problem with the prior art, that reduces the compression ratio of the intra-picture to reduce this pulsing effect, is that in order to maintain a certain overall compression ratio within the group of pictures, the quality of the inter-pictures is reduced due to a higher compression ratio. Thus, although the pulsing effect is reduced at the boundaries between the groups of pictures, the prior art introduces more artifacts to the inter-pictures within the group of pictures.

In addition, in the technique disclosed in Patent Reference 1, pulsing artifacts cannot be reduced until decoding is performed. Since coded image data contains pulsing artifacts, there is a problem that pulsing artifacts cannot be reduced in the case where the image data is decoded by another decoding apparatus in which the technique disclosed in Patent Reference 1 is not mounted.

In view of this, the present invention aims at providing a video coding apparatus and method for reducing pulsing artifacts which occur especially at transition parts between groups of pictures and improving the visual quality of the pictures. Further, the present invention aims at providing a video coding apparatus and method capable of reducing pulsing artifacts in coding.

SUMMARY OF THE INVENTION

In order to solve the above-described problem, the video coding apparatus of the present invention for reducing pulsing artifacts includes: a correlation calculation unit which calculates a correlation value indicating a correlation degree of correlation between a first block and one of a second block and a third block. The first block including one or more pixels included in a first original picture in an original picture sequence of original pictures, the second block including one or more pixels included in a second original picture which precedes the first original picture, and the third block being obtained by coding and reconstructing the second block. The video coding apparatus further includes a correlation judgment unit which judges whether the correlation value exceeds a pre-determined first threshold, and judge that the correlation is high in the case where the correlation value exceeds the pre-determined first threshold; and a blending unit which blends the first block and the third block in the case where the correlation judgment unit judges that the correlation is high.

With this, it becomes possible to reduce pulsing artifacts which occur especially at the transition part between two groups of pictures without increasing other kinds of artifacts. In addition, it is possible to reduce pulsing artifacts also in coding and decoding. Thus, it is possible to improve the visual quality of the pictures.

In addition, the present invention for reducing pulsing artifacts can be also realized as a video decoding apparatus, in addition to as a video coding apparatus. The video decoding apparatus of the present invention includes: a decoding unit which outputs a decoded video sequence including decoded pictures which are obtained by decoding coded pictures; a correlation calculation unit which calculates a correlation value indicating a degree of correlation between a first block and a second block. The first block includes one or more pixels included in a first decoded picture in the decoded video sequence, and the second block includes one or more pixels included in a second coded picture which precedes the first decoded picture. The video decoding apparatus further includes a correlation judgment unit which judges whether the correlation value exceeds a pre-determined first threshold, and judge that the correlation is high in the case where the correlation value exceeds the first threshold; and a blending unit which blends the first block and the second block in the case where the correlation judgment unit judges that the correlation is high.

Note that the present invention can be realized not only as an apparatus but also as a method having steps corresponding to processing units which makes up the apparatus. In addition, the present invention can be realized as a program causing a computer to execute these processing steps.

An advantageous effect of the present invention is to reduce pulsing artifacts which occur especially at the transition part between two independent groups of pictures of a compressed video sequence. The advantageous effect appears in the form of better visual quality.

Further Information about Technical Background to this Application

The disclosure of Japanese Patent Application No. 2007-031154 filed on Feb. 9, 2007 including specification, drawings and claims is incorporated herein by reference in its entirety.

BRIEF DESCRIPTION OF THE DRAWINGS

These and other objects, advantages and features of the invention becomes apparent from the following description thereof taken in conjunction with the accompanying drawings that illustrate a specific embodiment of the invention. In the Drawings:

FIG. 11 is a diagram showing an example in the case where a video sequence is coded on a slice-by-slice basis.

DESCRIPTION OF THE PREFERRED EMBODIMENT(S)

(First Embodiment)

A first embodiment of the present invention can be used as a pre-processing module before the coding of a video sequence. The processing for reducing pulsing artifacts includes three steps. The first step is to calculate the correlation between a current original picture to be coded and a previous original picture which is temporally prior to the current original picture to be coded. The second step is to judge whether the correlation calculated in the first step is high or low. The third step is performed when the correlation is judged to be high in the second step in order to blend the current original picture and the previous reconstructed picture obtained by coding the previous original picture. All of the three steps are executed on a block-by-block basis. Here, a block is a pixel or a group of pixels. Note that these processes may be executed on the following to-be-processed unit basis: a pixel, a picture, a slice, a macroblock or the like.

Figure 1:
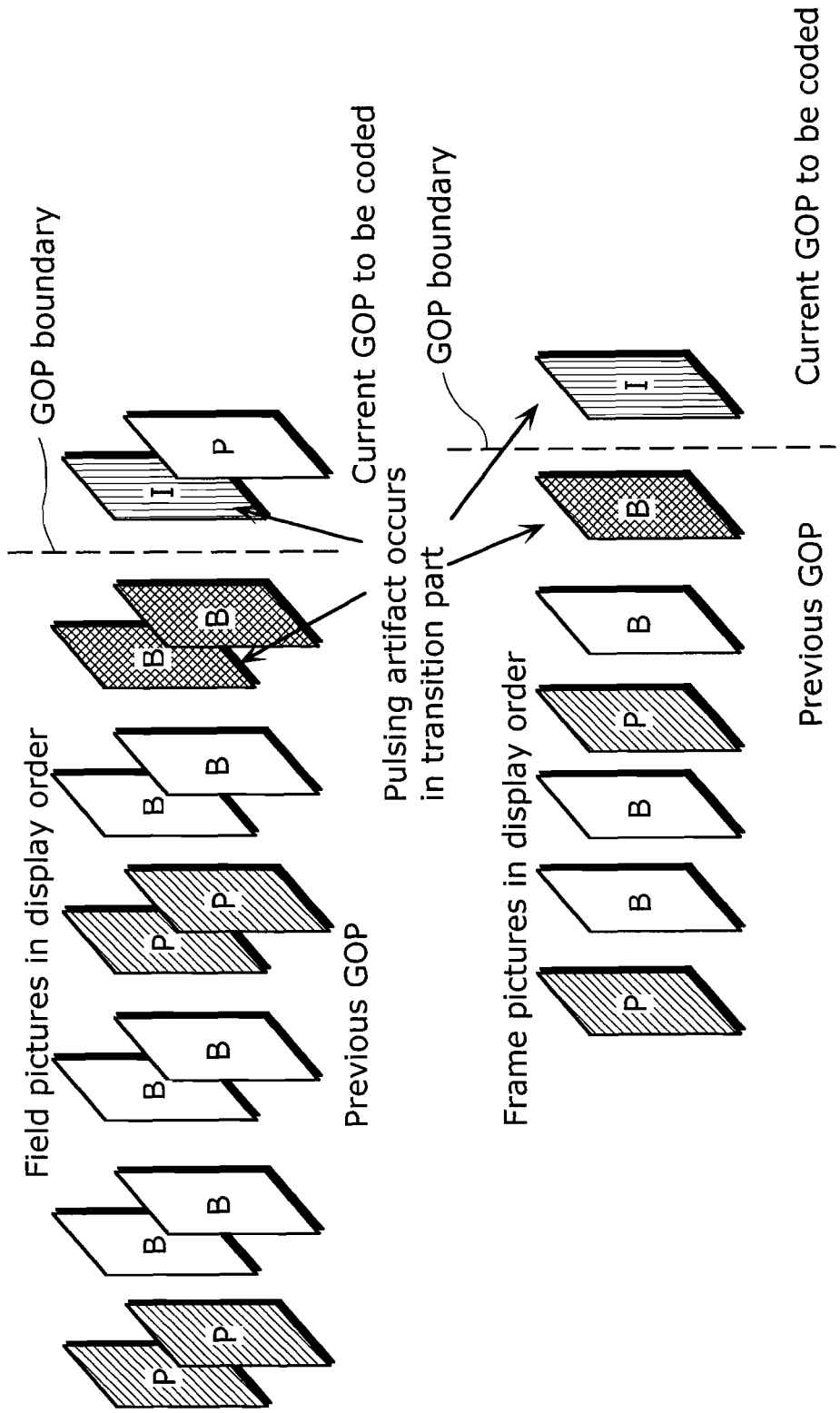
FIG. 1 is a diagram illustrating an example of pulsing artifacts in a coded video sequence.
Figure 2:
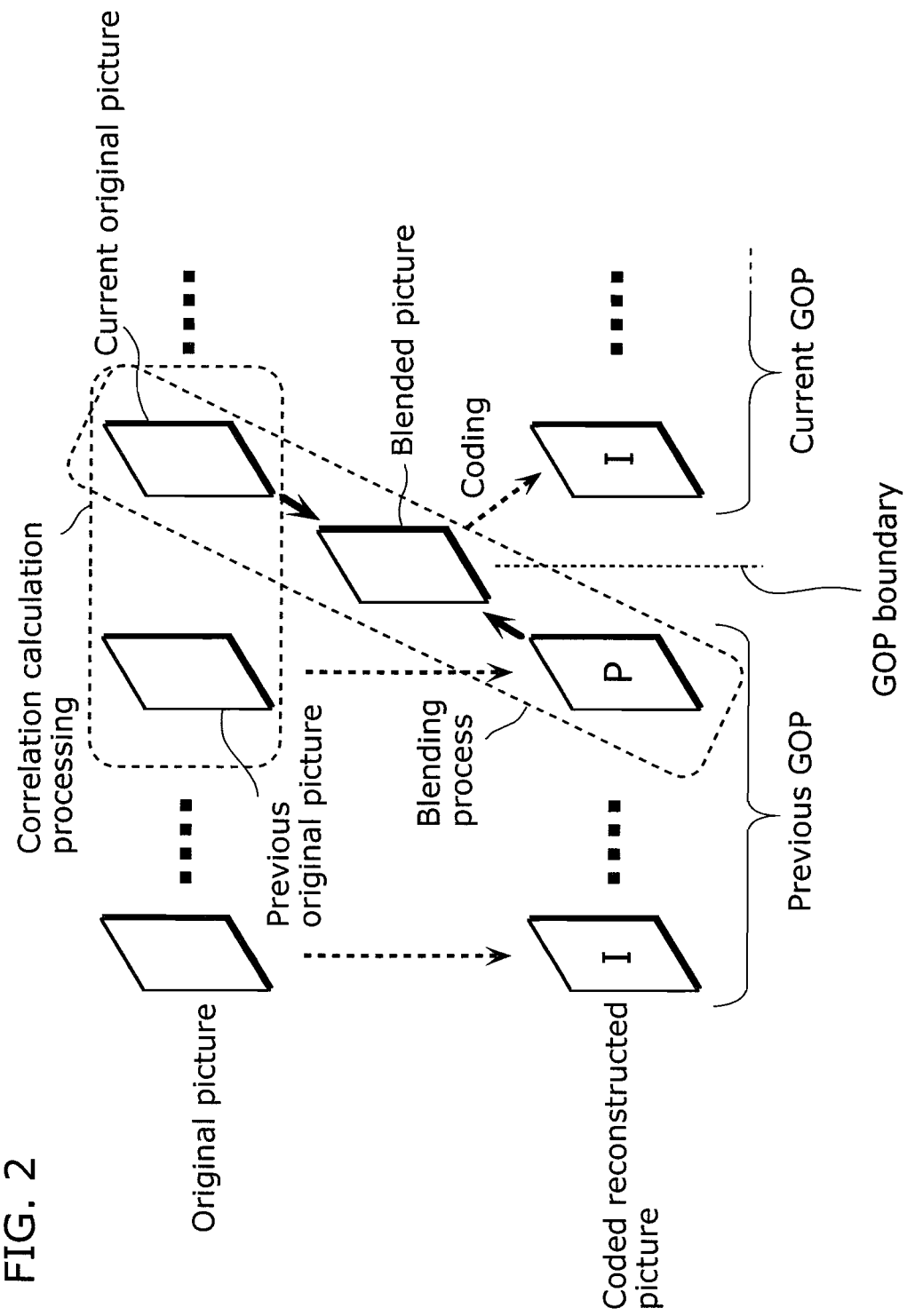
FIG. 2 is a diagram illustrating processing for reducing pulsing artifacts in a first embodiment of the present invention.

FIG. 2 is a diagram illustrating processing for reducing pulsing artifacts in the first embodiment of the present invention.

In this embodiment, a previous original picture temporally prior to the current original picture to be coded by intra-predictive coding is selected as a reference picture, and the correlation between the current original picture and the previous original picture is calculated. In the case where it is judged here that the correlation between the current original picture and the previous original picture is high, the current original picture and the previous reconstructed picture are blended. Next, the blended picture is coded by intra-predictive coding, and used as a starting picture in a current group of pictures (GOP). In other words, as shown in FIG. 2, the correlation calculation processing is performed on original pictures, and the blending processing is performed on the original picture and the reconstructed picture.

Figure 3:
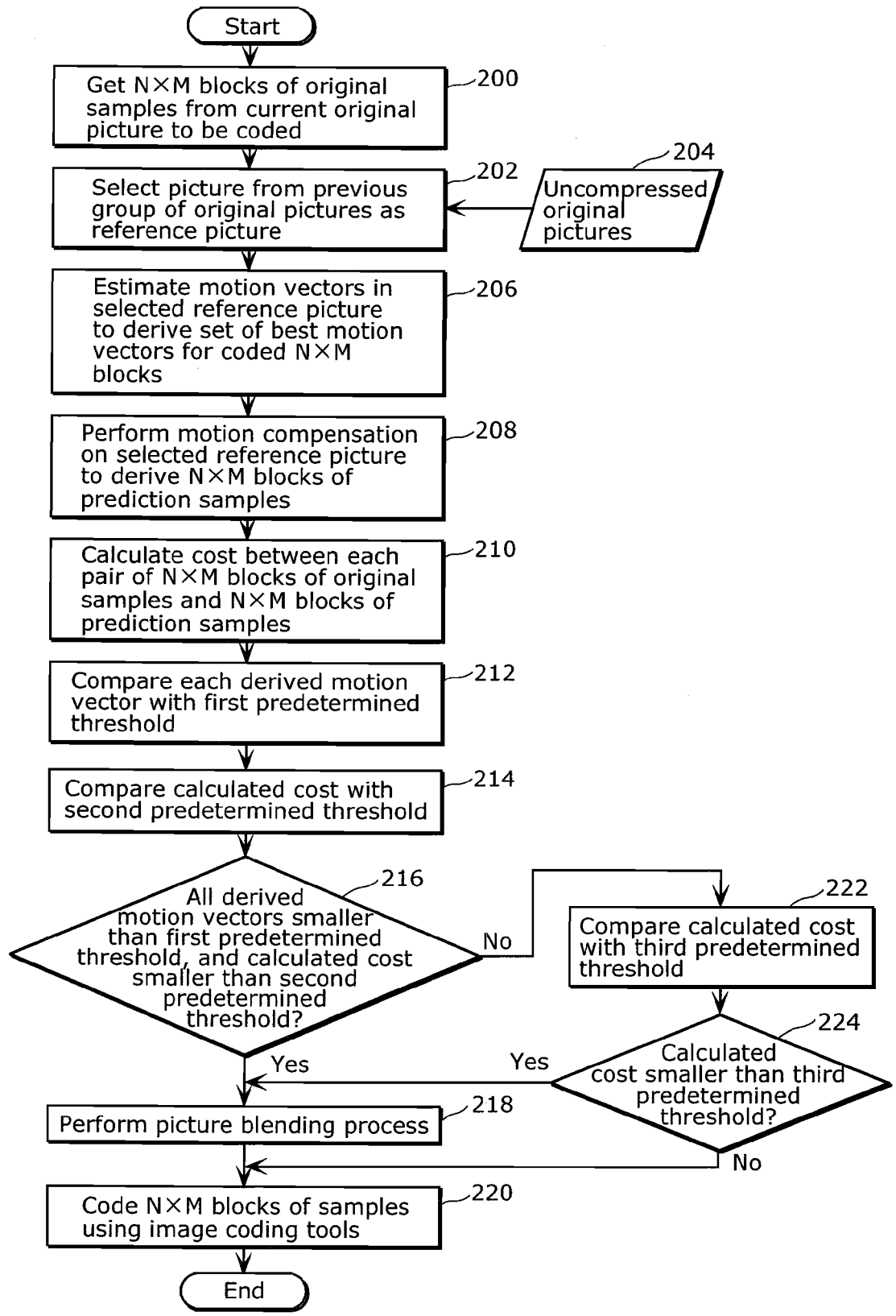
FIG. 3 is a flowchart showing video coding in the first embodiment of the present invention.

FIG. 3 shows a flowchart of processing for video coding in the first embodiment of the present invention. As shown in the figure, N×M blocks of uncompressed original samples are obtained from the current uncompressed original picture to be coded in a module 200. The original sample blocks correspond to samples of blocks in the current original picture to be coded. Here, N represents the number of pixels in width and M represents the number of pixels in height. Examples of N and M values are 16 and 16, respectively.

The N×M blocks of uncompressed original samples obtained in the module 200 are included in the original picture to be coded by intra-predictive coding (a picture obtainable by performing intra-predictive coding on the original picture is referred to as an I-picture). In this embodiment, the I-picture is formed at the ratio of one per 15 pictures. In other words, a GOP is structured with 15 pictures starting with the I-picture. Thus, in this embodiment, it is possible to execute a correlation calculation process and a picture blending process on pictures on which intra-predictive coding is performed with a high likelihood of pulsing artifacts.

Note that the ratio of appearance of I-pictures is changed depending on applications (television broadcasting, DVD recorders, contents for mobile telephones) and the like. Therefore, the method of selecting an original picture to be subjected to a correlation calculation process and a picture blending process in this embodiment may be modified depending on the I-picture appearance ratio. This is true of also in the other embodiments.

Next, in a module 202, a reference picture is selected from a group of original pictures stored in a picture memory as shown in a module 204. This reference picture corresponds to the previous original picture. A picture in this case can be referred to as a frame picture or a field picture. In one example of this embodiment, in the case where the current picture to be coded is a frame picture, the reference frame is selected based on the criteria that it is the nearest reference frame picture in time with respect to the current picture. In the case where the current picture is a field picture, the nearest reference field picture having the same field parity as that of the current field picture is selected.

In a module 206, a motion estimation step is performed on the selected reference picture to derive a set of motion vectors of the N×M blocks of uncompressed original samples. Based on the derived motion vectors, a motion compensation step is performed in a module 208 to derive N×M blocks of predicted samples.

In a module 210, a cost value is calculated based on an expression depending on a sum of absolute differences in the sample values of derived N×M blocks of prediction samples and the N×M blocks of original samples. The cost value is an example of the value indicating the degree of correlation between the original picture to be coded and the previous original picture. An example of expressions for calculating cost values is:

$$Cost = SAD + Lambda * MVCost \qquad \text{[Expression 1]}$$

Here, SAD is a sum of absolute differences of the prediction samples and original samples, Lambda is a constant value and MVCost represents the cost component that is dependent on the derived motion vectors. Lambda can be a zero value, and in the case, the MVCost component can be ignored.

The correlation between the current original picture and the previous original picture is calculated by executing the processes indicated by the above-mentioned modules 200 to 210. As shown in the Expression 1, the smaller the cost value, the higher the correlation.

In a module 212, the absolute values of the motion vectors derived from a module 206 are compared with a first pre-determined threshold. For example, the first pre-determined threshold is an integer. Next, in a module 214, the cost calculated from a module 210 is compared with a second pre-determined threshold. For example, the second pre-determined threshold is an integer.

In the case where the absolute values for all the components of motion vectors are smaller than the first pre-determined threshold and the calculated cost is smaller than the second pre-determined threshold as shown in a module 216, the picture blending process is performed on the N×M blocks of original samples as shown in a module 218.

In the case where the absolute value for any of the components of the motion vectors is not smaller than the first pre-determined threshold or the calculated cost is not smaller than the second pre-determined threshold, the calculated cost is compared with a third pre-determined threshold as shown in a module 222. For example, the third pre-determined threshold is an integer.

Here, the processes in the modules 212, 214, and 216 are performed to change the threshold for the cost depending on the absolute values of the motion vectors. In other words, in the first embodiment of the present invention, the threshold for judging that the correlation is high is changed depending on the amount of motion between the previous original picture and the current original picture.

In the case where a picture is blended, the quality of the picture may unintentionally deteriorate due to blurring which occurs at a portion having a significant motion. To prevent this, it is possible to employ a strict standard for judging a correlation for performing a picture blending process by setting, for such portion having a significant motion, a greater threshold for judging that the correlation is high (in other words, by setting a small threshold for a cost value).

In contrast, the amount of blurring which occurs through picture blending is small at a portion having a small motion. For this reason, it is possible to employ a less-strict standard for judging a correlation for performing a picture blending process by setting, for such portion having a small motion, a smaller threshold for judging that the correlation is high (in other words, by setting a greater threshold for a cost value).

In view of this, in the case where a sample block in the current original picture has a significant motion; that is, the absolute value of a motion vector is greater than the first threshold, the threshold for a cost value is set as the second threshold. In contrast, in the case where a sample block of the current original picture has a small motion; that is, the absolute value of a motion vector is smaller than the first threshold, the threshold for a cost value is set as the third threshold greater than the second threshold.

This makes it possible to calculate a correlation so that such blending process is performed at a portion having a small motion.

With the execution of the processes indicated by the modules 212 to 216 and 222, a judgment on whether the correlation between the current original picture and the previous original picture is high or not is made. In other words, in this embodiment, a judgment on whether the cost value shown by Expression 1 is smaller than the threshold or not is made.

In the case where the calculated cost is smaller than the third pre-determined threshold in a module 224, the picture blending process is performed on the N×M blocks of original samples in a module 218. Otherwise, the picture blending process is not performed on the N×M blocks of original samples and the N×M blocks of original samples are coded using image coding tools in a module 220. Examples of such tools include a spatial prediction tool, an orthogonal transform tool, a quantization tool and an entropy coding tool.

The picture blending process involves the steps to combine 1N×M blocks of prediction samples and N×M blocks of original samples based on the following Expression 2.

$$\text{Mod}[N,M] = (O[N,M]*W1 + P[N,M]*W2 + K) >> S \qquad \text{[Expression 2]}$$

Here, O[N,M] represents N×M blocks of original samples, P[N,M] represents N×M blocks of prediction samples, and Mod [N,M] represents N×M blocks of modified samples. W1 and W2 are weighting coefficients for determining an addition ratio between the original sample blocks and the prediction sample blocks. K is an offset value, and S is a numeral for shifting Mod [N,M] represented in a binary representation to the right. The values W1, W2, K and S are all integers. Examples of the values W1, W2, K and S are 1, 1, 1 and 1, respectively.

The N×M blocks of prediction samples used in the picture blending process can be an output of the module 208 or a result of another motion compensation step which is different from the motion compensation step where sets of motion vectors and reference pictures are used in the module 208.

The N×M blocks of modified samples from the picture blending process is then coded using image coding tools in the module 220. Examples of such tools include a spatial prediction tool, an orthogonal transform tool, a quantization tool and an entropy coding tool.

Figure 4:
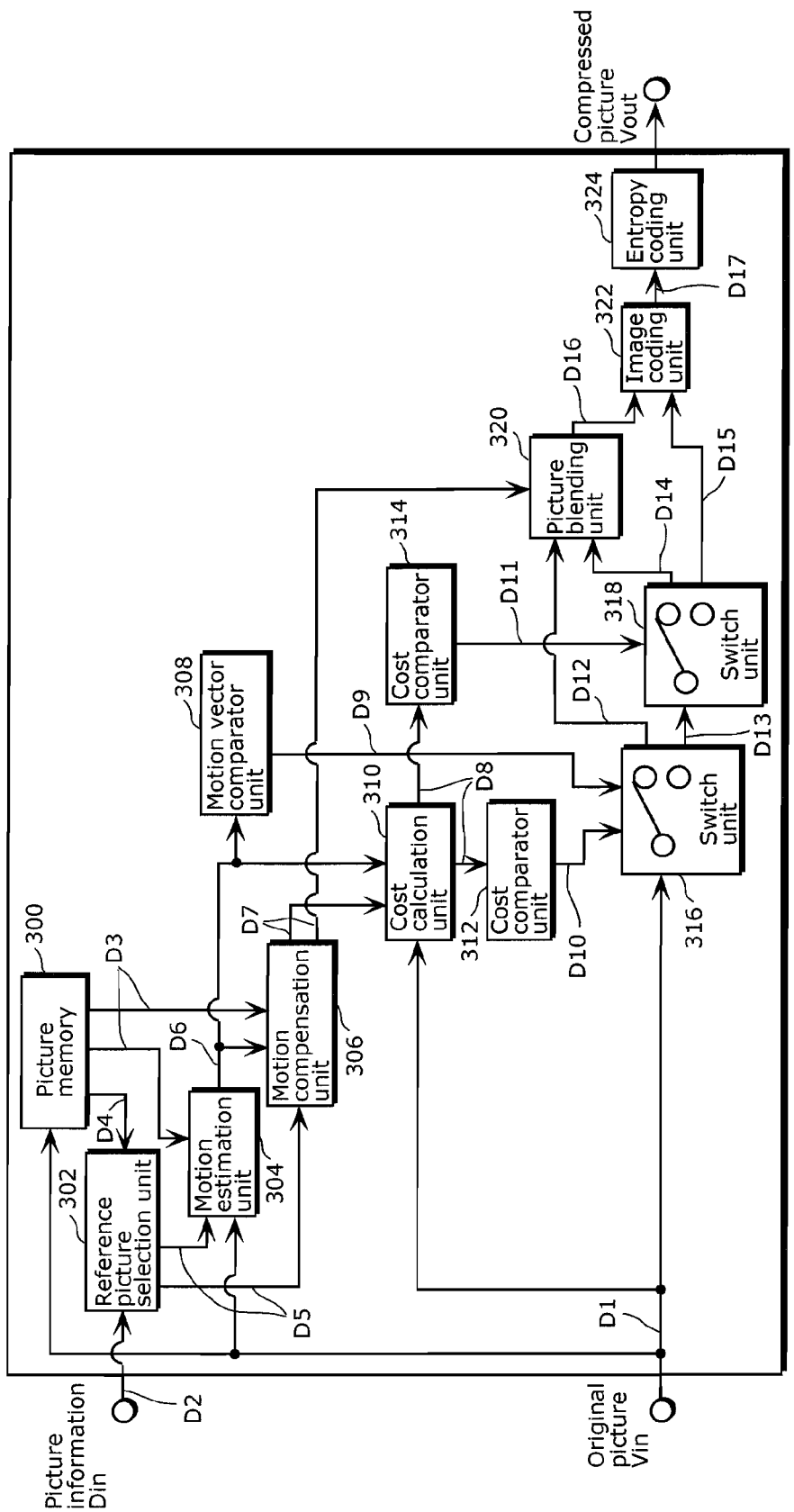
FIG. 4 is a block diagram showing an example of a video coding apparatus in the first embodiment of the present invention.

FIG. 4 shows an apparatus for the first embodiment of the present invention. The apparatus includes a picture memory 300, a reference picture selection unit 302, a motion estimation unit 304, a motion compensation unit 306, a motion vector comparator unit 308, a cost calculation unit 310, two cost comparator units 312 and 314, two switch units 316 and 318, a picture blending unit 320, an image coding unit 322 and an entropy coding unit 324.

The reference picture selection unit 302 receives current picture information D2 and reference picture information D4, selects a suitable reference picture based on the nearest temporal distance and outputs a reference index D5 to the motion estimation unit 304. N×M blocks of original samples D1 are received as an input Vin. The motion estimation unit 304 receives the N×M blocks of original samples D1, the reference index D5 and a reference picture D3. It outputs a set of motion vectors D6. Examples of N and M values are 16 and 16, respectively.

The motion vector comparator unit 308 takes the set of motion vectors D6, compares with a first pre-determined threshold and outputs a signal D9. In the case where the absolute values for all of the components of motion vectors are smaller than the first pre-determined threshold, the signal D9 is set to 1. Otherwise, the signal D9 is set to 0.

The motion compensation unit 306 then takes the reference index D5, the set of motion vectors D6 and a reference picture D3. It outputs N×M blocks of prediction samples D7. The cost calculation unit 310 takes the N×M blocks of prediction samples D7, the N×M blocks of original samples D1 and the set of motion vectors D6. It outputs a cost value D8 to a cost comparator unit 312. The cost comparator unit 312 takes the cost value D8, compares it with a second pre-determined threshold, and outputs a signal D10 to a switch unit 316. In the case where the calculated cost is smaller than the second pre-determined threshold, the signal D10 is set to 1. Otherwise, the signal D10 is set to 0.

The switch unit 316 connects an output D12 to an input D1 or an output D13 to the input D1 depending on the signals D10 and D9. In the case where both signals D10 and D9 are 1, the output D12 is connected to the input D1. Otherwise, the output D13 is connected to the input D1.

A second cost comparator unit 314 takes the cost value D8, compares it with a third pre-determined threshold and outputs a signal D11 to a second switch unit 318. In the case where the calculated cost is smaller than the third pre-determined threshold, the signal D11 is set to 1. Otherwise, the signal D11 is set to 0.

The switch unit 318 connects an output D14 to an input D13 or an output D15 to the input D13 depending on the signal D11. In the case where the signal D11 is 1, the output D14 is connected to the input D13. Otherwise, the output D15 is connected to the input D13.

The picture blending unit 320 takes one of the following inputs: N×M blocks of prediction samples D7; and N×M blocks of original samples from either D14 or D12 whichever is signaled. The picture blending unit 320 performs a picture blending process. The picture blending unit 320 then outputs N×M blocks of modified samples D16 to the image coding unit 322. The image coding unit takes N×M blocks of samples either from D16 or D15 whichever is signaled, and outputs to N×M blocks of quantized residuals D17 to the entropy coding unit 324. Finally, the entropy coding unit 324 codes the N×M blocks of quantized residuals and outputs the compressed bitstreams Vout.

As described above, according to the first embodiment of the present invention, a process for blending a current original picture to be coded by intra-predictive coding and a previous reconstructed picture is executed in the case where the correlation between the current original picture and the previous original picture is judged to be high. This makes it possible to carry over the coding characteristics in the previous GOP to the current GOP, and thus to reduce pulsing artifacts which occur between two GOPs. Thus, it becomes possible to improve the visual quality of the pictures.

(Second Embodiment)

A second embodiment of the present invention can be used as a pre-processing module before the coding of a video sequence. The processing for reducing pulsing artifacts includes three steps. The first step is to calculate the correlation between a current original picture to be coded and a previous reconstructed picture which is obtained by coding a previous original picture temporally prior to the current original picture to be coded. The second step is to judge whether the correlation calculated in the first step is high or low. The third step is performed when the correlation is judged to be high in order to blend the current original picture and the previous reconstructed picture in the case where the correlation is judged to be high in the second step. Similar to the case in the first embodiment, all of the three steps are executed on a block-by-block basis. Here, a block is a pixel or a group of pixels.

Figure 5:
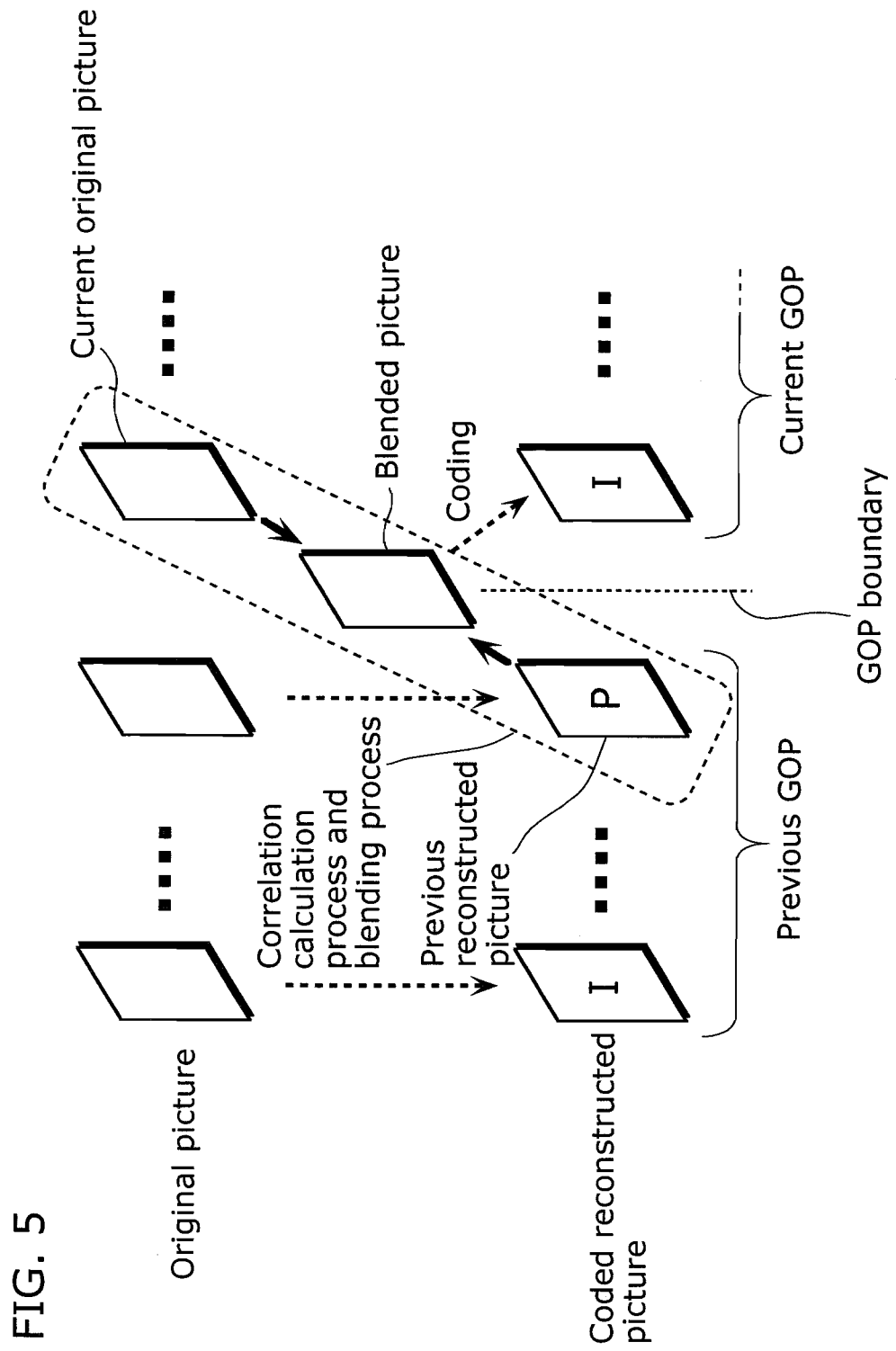
FIG. 5 is a diagram illustrating processing for reducing pulsing artifacts in a second embodiment of the present invention.

FIG. 5 is a diagram illustrating processing for reducing pulsing artifacts in the second embodiment of the present invention.

In this embodiment, the correlation between the current original picture and the reconstructed original picture is calculated by selecting, as a reference picture, a previous reconstructed picture which is obtained by coding the previous original picture temporally prior to the current original picture which is coded by intra-predictive coding. Here, in the case where the correlation between the current original picture and the previous reconstructed picture is judged to be high, the current original picture and the previous reconstructed picture are blended. Next, intra-predictive coding is performed on the blended picture to use it as a starting picture in the current GOP. In other words, as shown in FIG. 5, the correlation calculation process and blending process are executed on the original picture and the reconstructed picture.

Figure 6:
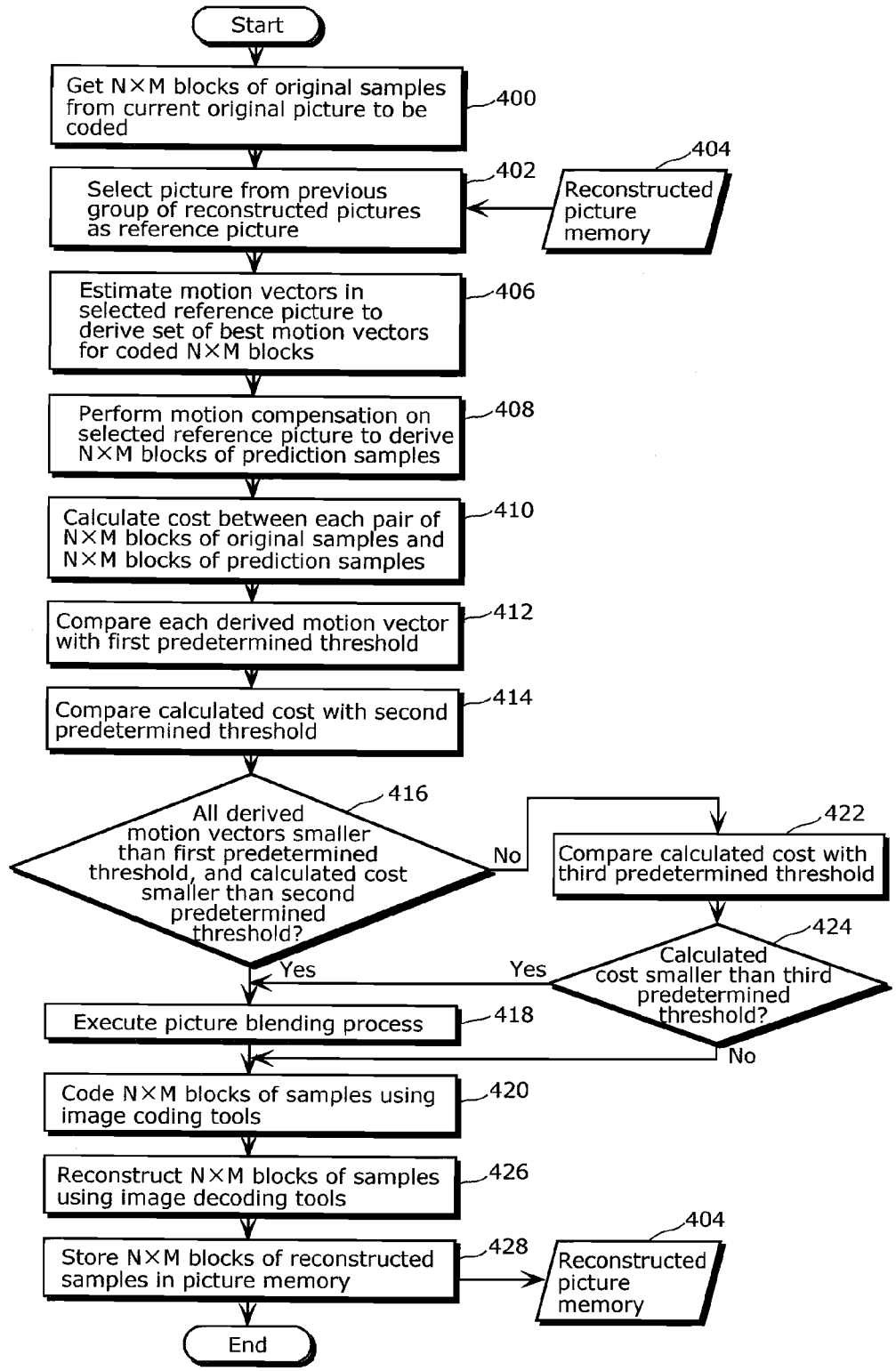
FIG. 6 is a flowchart showing video coding in the second embodiment of the present invention.

FIG. 6 shows a flowchart of the video coding process in the second embodiment of the present invention. As shown in the figure, N×M blocks of uncompressed original samples are obtained from the current uncompressed original picture in a module 400. This original sample blocks correspond to sample blocks of the current original picture to be coded. Here, N represents the number of pixels in width and M represents the number of pixels in height. Examples of N and M values are 16 and 16, respectively.

The second embodiment of the present invention is similar to the first embodiment except that a reference picture is selected from a group of reconstructed pictures in a module 402, instead of selecting a reference picture from a group of original pictures. In other words, the second embodiment differs from the first embodiment in that the correlation between an original picture and a reconstructed picture is calculated, whereas, in the first embodiment, the correlation between the original pictures is calculated.

In the module 402, a reference picture is selected from a group of reconstructed pictures stored in a picture memory as shown in a module 404. This reference picture corresponds to the previous reconstructed picture. A picture in this case can be a frame picture or a field picture. In one example of this embodiment, in the case where the current picture is a frame picture, the reference frame is selected based on the criteria that it is the reference frame picture temporally nearest to the current picture. In the case where the current picture is a field picture, the nearest reference field picture having the same field parity as that of the current field picture is selected.

In a module 406, a motion estimation step is performed on the selected reference picture to derive a set of motion vectors of the N×M blocks of uncompressed original samples. Based on the derived motion vectors, a motion compensation step is performed in a module 408 to derive N×M blocks of predicted samples.

In a module 410, a cost value is calculated based on an Expression depending on a sum of absolute differences of the sample values of derived N×M prediction samples and the N×M blocks of original samples. The cost value is an example of a value indicating the degree of correlation between the current original picture and the previous reconstructed picture. An example of expressions for calculating cost values is:

$$\text{Cost}=SAD+\text{Lambda}*MV\text{Cost} \quad \text{[Expression 3]}$$

Here, SAD is a sum of absolute differences of the prediction samples and original samples, Lambda is a constant value and MVCost represents the cost component that is dependent on the derived motion vectors. Lambda can be a zero value, and in the case, the MVCost component can be ignored.

The correlation between the current original picture and the previous reconstructed picture is calculated by executing the processes indicated by the modules 400 to 410. As shown in the Expression 3, the smaller the cost value, the higher the correlation.

In a module 412, the absolute values of the derived motion vectors from a module 406 are compared with a first pre-determined threshold. For example, the first pre-determined threshold is an integer. Next, in a module 414, the calculated cost from a module 410 is compared with a second pre-determined threshold. An example of the second pre-determined threshold is an integer.

In the case where the absolute values for all of the components of motion vectors are smaller than the first pre-determined threshold and the calculated cost is smaller than the second pre-determined threshold as shown in a module 416, the picture blending process is performed on the N×M blocks of original samples as shown in a module 418.

In the case where the absolute value for any of the components of the motion vectors is not smaller than the first pre-determined threshold or the calculated cost is not smaller than the second pre-determined threshold, the calculated cost is compared with a third pre-determined threshold as shown by the module 422. For example, the third pre-determined threshold is an integer.

Here, the processes in the modules 412, 414, and 416 are performed to change the threshold of the cost depending on the absolute values of the motion vectors. In other words, in the second embodiment of the present invention, the threshold for judging that the correlation is high is changed depending on the amount of motion between the previous reconstructed picture and the current original picture.

Similar to the case in the first embodiment, in the case where a sample block of the current original picture has a significant motion; that is, the absolute value of a motion vector is greater than the first threshold, the threshold for a cost value is set as the second threshold. In contrast, in the case where a sample block of the current original picture has a small motion; that is, the absolute value of a motion vector is smaller than the first threshold, the threshold for a cost value is set as the third threshold greater than the second threshold. This makes it possible to calculate a correlation so that such blending process is performed at a portion having a small motion.

With the execution of the processes indicated by the modules 412 to 416 and 422, a judgment on whether the correlation between the current original picture and the previous reconstructed picture is high or not is made. In other words, in this embodiment, a judgment on whether the cost value shown by Expression 3 is smaller than the threshold or not is made.

In the case where the calculated cost is smaller than the third pre-determined threshold in a module 424, the picture blending process is performed on the N×M blocks of original samples in a module 418. Otherwise, the picture blending process is not performed on the N×M blocks of original samples and the N×M blocks of original samples are coded using image coding tools in a module 420. Examples of such tools include a spatial prediction tool, an orthogonal transform tool, a quantization tool and an entropy coding tool.

The picture blending process involves the steps to combine an N×M blocks of prediction samples and N×M blocks of original samples based on the following Expression 4.

$$\text{Mod }[N,M]=(O[N,M]*W1+P[N,M]*W2+K)>>S \quad \text{[Expression 4]}$$

Here, O[N,M] represents N×M blocks of original samples, P[N,M] represents N×M blocks of prediction samples, and Mod [N,M] represents N×M blocks of modified samples. W1 and W2 are weighting coefficients for determining an addition ratio between the original sample blocks and the prediction sample blocks. K is an offset value, and S is a numeral for shifting Mod [N,M] represented in a binary representation to the right. The values W1, W2, K and S are all integers. Examples of the values W1, W2, K and S are 1, 1, 1 and 1, respectively.

The N×M blocks of prediction samples used in the picture blending process can be an output of the module 408 or as a result of another motion compensation step which is different from the motion compensation step where sets of motion vectors and reference pictures are used in the module 408.

The N×M blocks of modified samples from the picture blending process is then coded using image coding tools in the module 420. Examples of such tools include a spatial prediction tool, a temporal prediction tool, an orthogonal transform tool, a quantization tool and an entropy coding tool.

In a module 426, the N×M blocks of coded samples are reconstructed using image decoding tools and stored into the reconstructed picture memory in the module 428. Examples of such image decoding tools include a spatial prediction tool, a temporal prediction tool, an inverse orthogonal transform tool, an inverse quantization tool and an entropy decoding tool.

Figure 7:
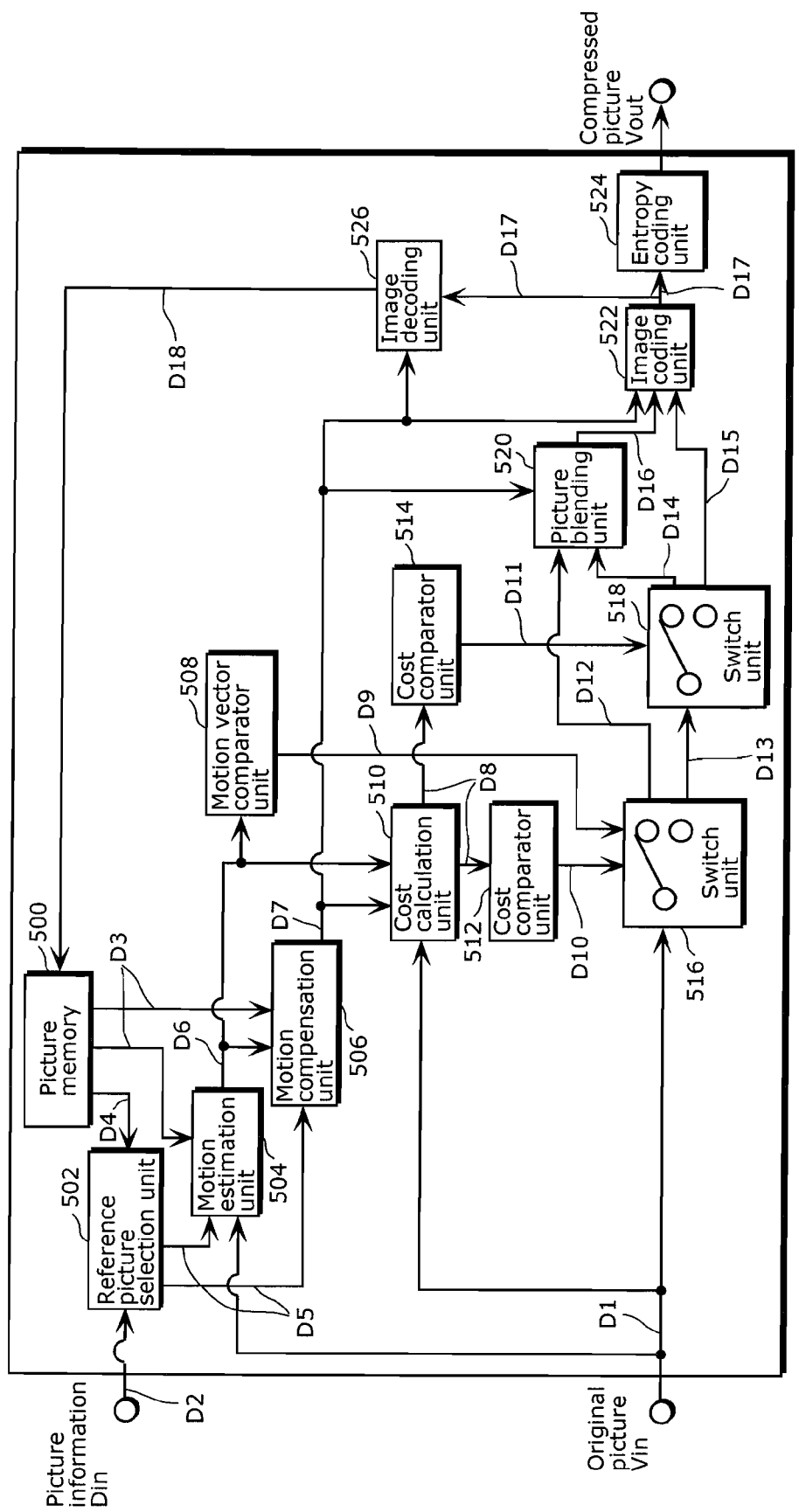
FIG. 7 is a block diagram showing an example of a video coding apparatus in the second embodiment of the present invention.

FIG. 7 shows an apparatus for the second embodiment of the present invention. The apparatus includes a picture memory 500, a reference picture selection unit 502, a motion estimation unit 504, a motion compensation unit 506, a motion vector comparator unit 508, a cost calculation unit 510, two cost comparator units 512 and 514, two switch units 516 and 518, a picture blending unit 520, an image coding unit 522, an entropy coding unit 524 and an image decoding unit 526.

The reference picture selection unit 502 receives current picture information D2 and reference picture information D4, selects a suitable reference picture based on the nearest temporal distance and outputs a reference index D5 to the motion estimation unit 504. The picture memory 500 contains one or more reconstructed pictures.

An N×M blocks of original samples D1 is received as an input Vin. The motion estimation unit 504 receives the N×M blocks of original samples D1, the reference index D5 and a reference picture D3. It outputs a set of motion vectors D6. Examples of N and M values are 16 and 16, respectively.

The motion vector comparator unit 508 takes the set of motion vectors D6, compares it with a first pre-determined threshold and outputs a signal D9. In the case where the absolute values for every component of motion vectors are all smaller than the first pre-determined threshold, the signal D9 is set to 1. Otherwise, the signal D9 is set to 0.

The motion compensation unit 506 then takes the reference index D5, the set of motion vectors D6 and a reference picture D3. It outputs N×M blocks of prediction samples D7. The cost calculation unit 510 takes the N×M blocks of prediction samples D7, the N×M blocks of original samples D1 and the set of motion vectors D6. It outputs a cost value D8 to a cost comparator unit 512. The cost comparator unit 512 takes the cost value D8, compares it with a second pre-determined threshold and outputs a signal D10 to a switch unit 516. In the case where the calculated cost is smaller than the second pre-determined threshold, the signal D10 is set to 1. Otherwise, the signal D10 is set to 0.

The switch unit 516 connects an output D12 to an input D1 or an output D13 to the input D1 depending on the signals D10 and D9. In the case where both signals D10 and D9 are 1, the output D12 is connected to the input D1. Otherwise, the output D13 is connected to the input D1.

A second cost comparator unit 514 takes the cost value D8, compares it with a third pre-determined threshold, and outputs a signal D11 to a second switch unit 518. In the case where the calculated cost is smaller than the third pre-determined threshold, the signal D11 is set to 1. Otherwise, the signal D11 is set to 0.

The switch unit 518 connects an output D14 to an input D13 or an output D15 to the input D13 depending on the signal D11. In the case where the signal D11 is 1, the output D14 is connected to the input D13. Otherwise, the output D15 is connected to the input D13.

The picture blending unit 520 takes one of the following inputs: N×M blocks of prediction samples D7; and N×M blocks of original samples from either D14 or D12 whichever is signaled, and performs a picture blending process. The picture blending unit then outputs N×M blocks of modified samples D16 to the image coding unit 522.

The image coding unit 522 takes N×M blocks of samples either from D16 or D15 whichever is signaled. In some implementations of the present invention, the image coding unit 522 accepts N×M blocks of prediction samples D7 from the motion compensation unit 506 as an additional input to be used for the coding of the N×M blocks of samples. The image coding unit 522 then outputs N×M blocks of quantized residuals D17 to the entropy coding unit 524 and the image decoding unit 526.

The entropy coding unit 524 codes the N×M blocks of quantized residuals and outputs the compressed bitstreams Vout. The image decoding unit 526 decodes and reconstructs the quantized residuals D17. In some implementation of the current embodiment, the image decoding unit 526 takes the N×M blocks of prediction samples D7 from the motion compensation unit 506 to reconstruct the N×M blocks of samples. The image decoding unit 526 finally outputs the N×M blocks of reconstructed samples D18 and stores the reconstructed samples into the picture memory 500.

As described above, according to the second embodiment of the present invention, a process for blending a current original picture to be coded by intra-predictive coding and a previous reconstructed picture is executed in the case where the correlation between the current original picture and the previous reconstructed picture is judged to be high. This makes it possible to carry over the coding characteristics in the previous GOP to the current GOP, and thus to reduce pulsing artifacts which occur between two GOPs. Thus, it becomes possible to improve the visual quality of the pictures.

(Third Embodiment)

A third embodiment of the present invention can be used as a post-processing module after the decoding of a video sequence. The processing for reducing pulsing artifacts includes three steps. The first step is to calculate the correlation between a current decoded picture to be processed and a previous decoded picture temporally prior to the current decoded picture to be processed. The second step is to judge whether the correlation calculated in the first step is high or not. The third step is performed when the correlation is judged to be high in order to blend the current decoded picture and the previous decoded picture. Similar to the cases in the first and second embodiments, all of the three steps are executed on a block-by-block basis. Here, a block is a pixel or a group of pixels.

Figure 8:
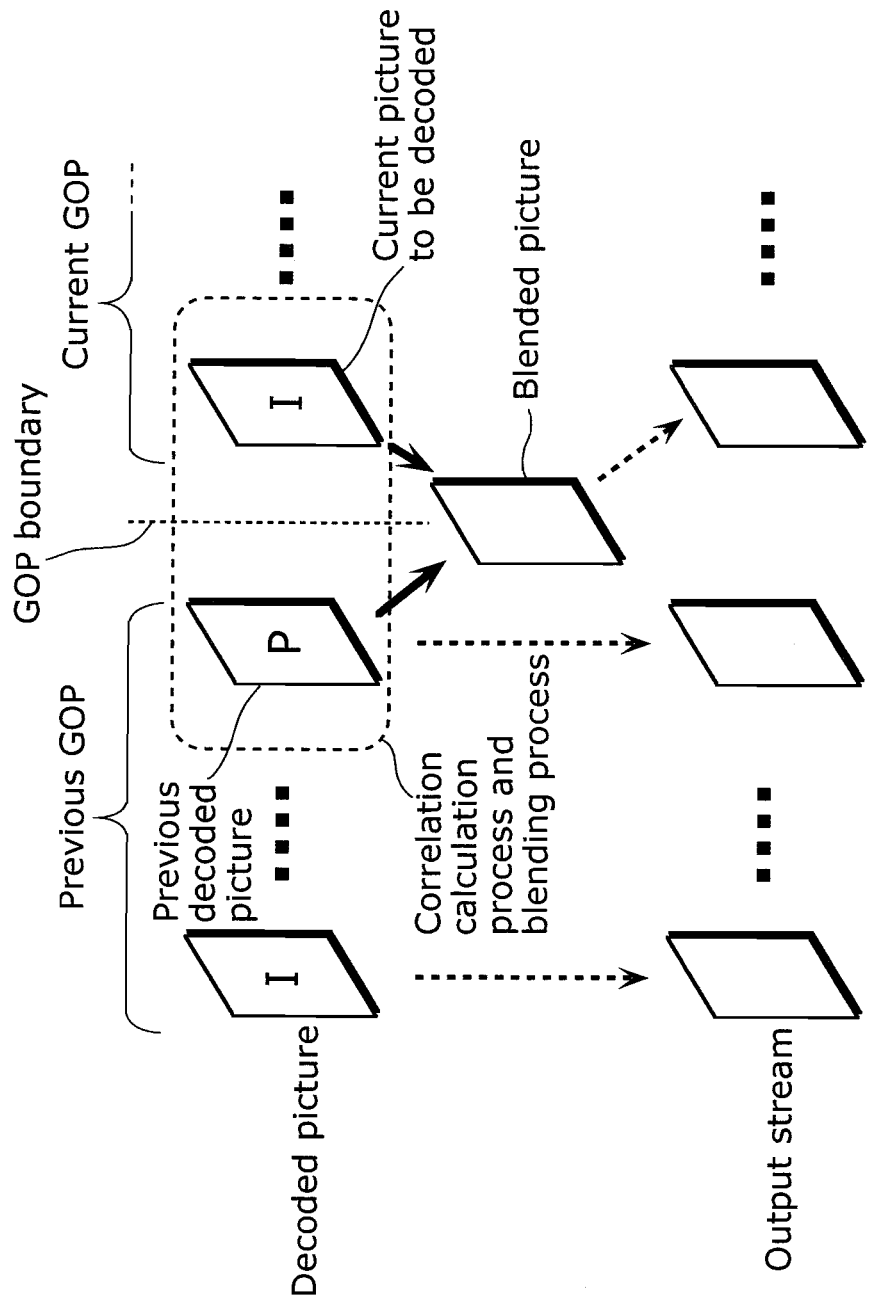
FIG. 8 is a diagram illustrating processing for reducing pulsing artifacts in a third embodiment of the present invention.

FIG. 8 is a diagram illustrating the processing for reducing pulsing artifacts in the third embodiment of the present invention.

In this embodiment, the correlation between the current decoded picture and the previous decoded picture is calculated by selecting, as a reference picture, the previous decoded picture temporally prior to the current decoded picture obtained by decoding the coded picture coded by intra-predictive coding. Here, in the case where the correlation between the current decoded picture and the previous decoded picture is judged to be high, the current decoded picture and the previous decoded picture are blended. Next, the blended picture is outputted as a picture included in an output stream. In other words, as shown in FIG. 8, the correlation calculation process and blending process are performed on the decoded pictures.

Figure 9:
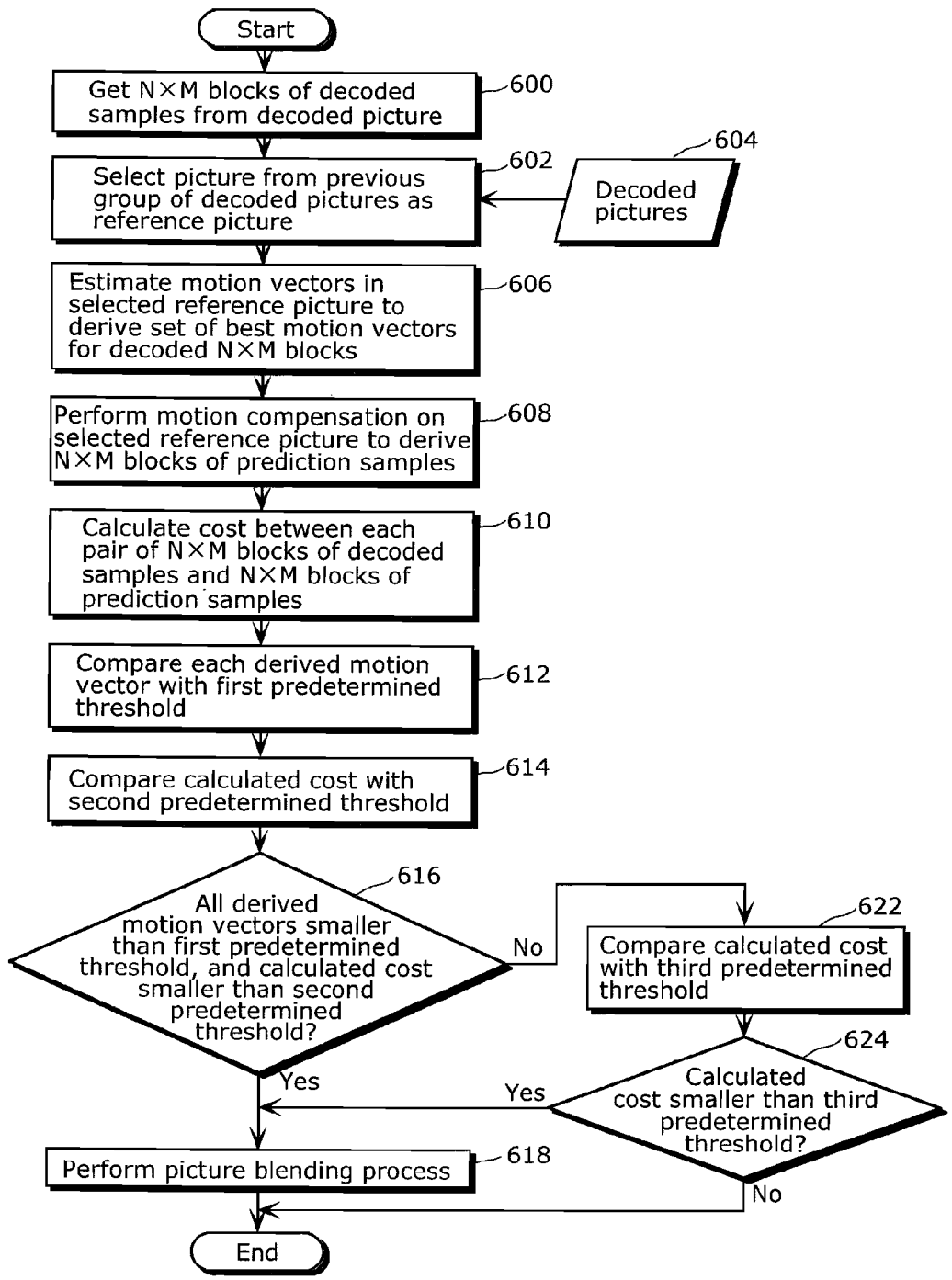
FIG. 9 is a flowchart showing a video decoding processing in the third embodiment of the present invention.

FIG. 9 shows a flowchart of the video decoding process for the third embodiment of the present invention. As shown in the figure, N×M blocks of decoded samples are obtained from the current decoded picture in a module 600. The decoded sample blocks correspond to sample blocks of the decoded picture. Here, N represents the number of pixels in width and M represents the number of pixels in height. Examples of N and M values are 16 and 16, respectively.

In a module 602, a reference picture is selected from a group of decoded pictures stored in a picture memory as shown in a module 604. The reference picture corresponds to the previous decoded picture. A picture in this case can be referred to as a frame picture or a field picture. In one example of this embodiment, in the case where the current picture is a frame picture, the reference frame is selected based on the criteria that it is the reference frame picture temporally nearest to the current picture. In the case where the current picture is a field picture, the nearest reference field picture having the same field parity as current field picture is selected.

In a module 606, a motion estimation step is performed on the selected reference picture to derive a set of motion vectors of the N×M blocks of uncompressed original samples. Based on the derived motion vectors, a motion compensation step is performed in a module 608 to derive N×M blocks of predicted samples.

In a module 610, a cost value is calculated based on an expression depending on a sum of absolute differences of the sample values of derived N×M blocks of prediction samples and the N×M blocks of decoded samples. The cost value is an example of a value indicating the degree of correlation between the current decoded picture and the previous decoded picture. An example of expressions for calculating cost values is:

$$\text{Cost} = SAD + \text{Lambda} * MV\text{Cost} \qquad \text{[Expression 5]}$$

Here, SAD is a sum of absolute differences of the prediction samples and decoded samples, Lambda is a constant value, and MVCost represents the cost component that is dependent on the derived motion vectors. Lambda can be a zero value, and in the case, the MVCost component can be ignored.

With the execution of the processes indicated by the modules 600 to 610, the correlation between the current decoded picture and the previous decoded picture is calculated. As shown in Expression 5, the smaller the cost value is, the higher the correlation is.

In a module 612, the absolute values of the derived motion vectors from a module 606 are compared with a first pre-determined threshold. An example of the first pre-determined threshold is an integer. Next, in a module 614, the calculated cost from a module 610 is compared with a second pre-determined threshold. For example, the second pre-determined threshold is an integer.

In the case where the absolute values for all of the components of motion vectors are smaller than the first pre-determined threshold and the calculated cost is smaller than the second pre-determined threshold as shown in a module 616, the picture blending process is performed on the N×M blocks of original samples as shown in a module 618.

In the case where the absolute value for any of the components of the motion vectors is not smaller than the first pre-determined threshold or the calculated cost is not smaller than the second pre-determined threshold, the calculated cost is compared with a third pre-determined threshold as shown in the module 622. For example, the third pre-determined threshold is an integer.

Here, the processes in the modules 612, 614, and 616 are performed to change the threshold for the cost depending on the absolute values of the motion vectors. In other words, in the third embodiment of the present invention, the threshold for judging that the correlation is high is changed depending on the amount of motion between the previous decoded picture and the current decoded picture.

Similar to the cases in the first and second embodiments, in the case where a sample block of the current decoded picture has a significant motion; that is, the absolute value of a motion vector is greater than the first threshold, the threshold for a cost value is set as the second threshold. In contrast, in the case where a sample block of the current decoded picture has a small motion; that is, the absolute value of a motion vector is smaller than the first threshold, the threshold for a cost value is set as the third threshold greater than the second threshold. This makes it possible to calculate the correlation so that a blending process is performed on a portion having a small motion.

With the execution of the processes indicated by the modules 612 to 616 and 622, a judgment on whether the correlation between the current decoded picture and the previous decoded picture is high or not is made. In other words, in this embodiment, a judgment on whether the cost value shown by Expression 5 is smaller than the threshold or not is made.

In the case where the calculated cost is smaller than the third pre-determined threshold in a module 624, the picture blending process is performed on the N×M blocks of original samples in the module 618. Otherwise, the picture blending process is not performed on the N×M blocks of decoded samples, and the N×M blocks of decoded samples are displayed.

The picture blending process involves the steps to combine N×M blocks of prediction samples and N×M blocks of decoded samples based on the following Expression 6.

$$\text{Mod}[N,M] = (O[N,M]*W1 + P[N,M]*W2 + K) >> S \quad \text{[Expression 6]}$$

Here, O[N,M] represents N×M blocks of decoded samples, P[N,M] represents N×M blocks of prediction samples, and Mod [N,M] represents N×M blocks of modified samples. W1 and W2 are weighting coefficients for determining an addition ratio between the original sample blocks and the prediction sample blocks. K is an offset value, and S is a numeral for shifting Mod [N,M] represented in a binary representation to the right. The values W1, W2, K and S are all integers. Examples of the values W1, W2, K and S are 1, 1, 1 and 1, respectively. The N×M blocks of modified samples after the picture blending process is displayed.

The N×M blocks of prediction samples used in the picture blending process can be an output of the module 408 or as a result of another motion compensation step which is different from the motion compensation step where sets of motion vectors and reference pictures are used in the module 408.

Figure 10:
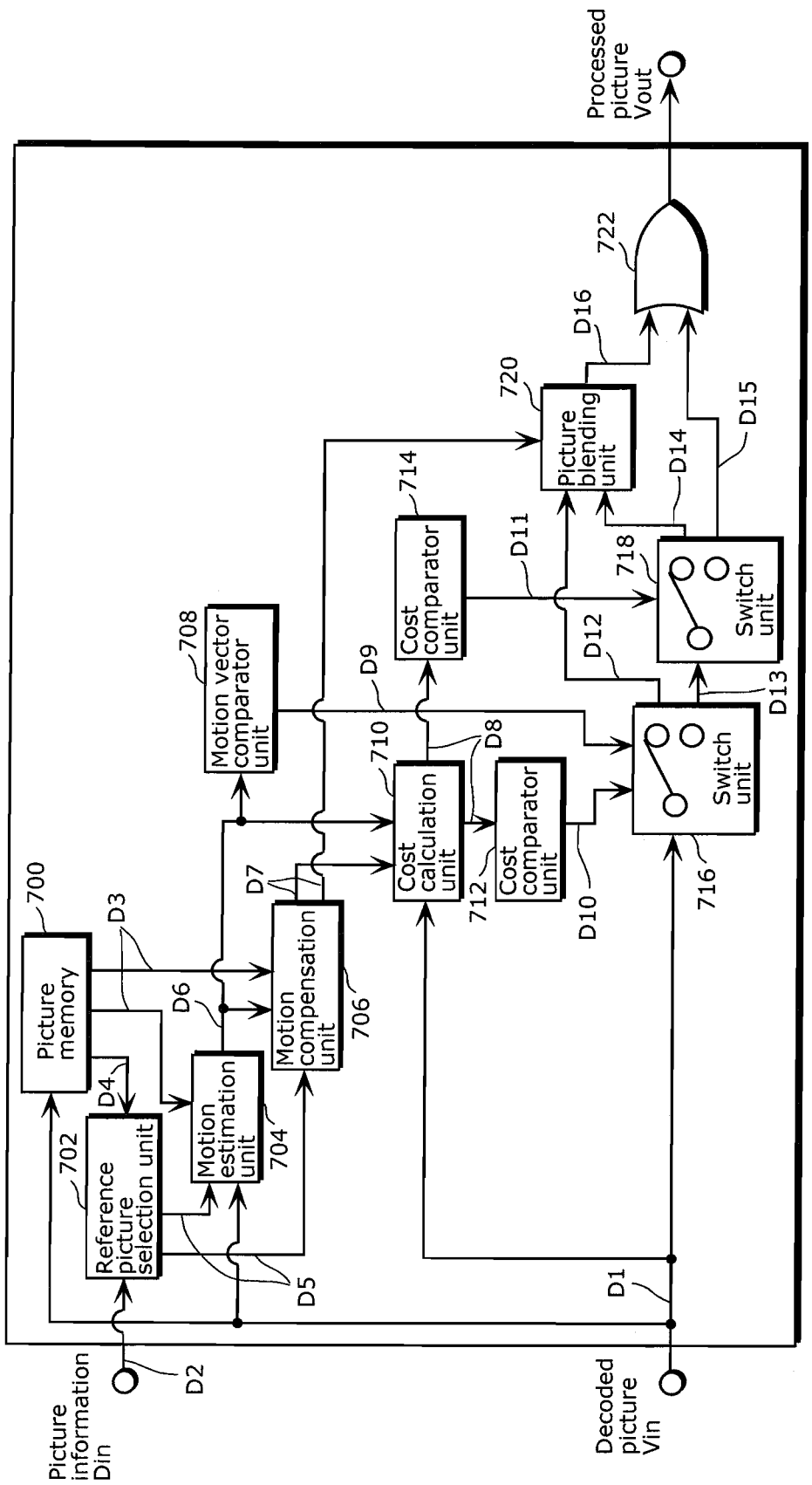
FIG. 10 is a block diagram showing an example of a video decoding apparatus in the third embodiment of the present invention.

FIG. 10 shows an apparatus for the third embodiment of the present invention. The apparatus includes a picture memory 700, a reference picture selection unit 702, a motion estimation unit 704, a motion compensation unit 706, a motion vector comparator unit 708, a cost calculation unit 710, two cost comparator units 712 and 714, two switch units 716 and 718, a picture blending unit 720, and an OR Gate unit 722.

The reference picture selection unit 702 receives current decoded picture information D2 and reference picture information D4, selects a suitable reference picture based on the nearest temporal distance and outputs a reference index D5 to the motion estimation unit 704. The picture memory 700 contains one or more decoded pictures.

N×M blocks of decoded samples D1 is received as an input Vin. The motion estimation unit 704 receives the N×M blocks of decoded samples D1, the reference index D5 and a reference picture D3. It outputs a set of motion vectors D6. Examples of N and M values are 16 and 16, respectively.

The motion vector comparator unit 708 takes the set of motion vectors D6, compares it with a first pre-determined threshold and outputs a signal D9. In the case where the absolute values for all of the components of motion vectors are smaller than the first pre-determined threshold, the signal D9 is set to 1. Otherwise, the signal D9 is set to 0.

The motion compensation unit 706 then takes the reference index D5, the set of motion vectors D6 and a reference picture D3. It outputs N×M blocks of prediction samples D7. The cost calculation unit 710 takes the N×M blocks of prediction samples D7, the N×M blocks of decoded samples D1 and the set of motion vectors D6. It outputs a cost value D8 to a cost comparator unit 512. The cost comparator unit 712 takes the cost value D8, compares it with a second pre-determined threshold and outputs a signal D10 to a switch unit 716. In the case where the calculated cost is smaller than the second pre-determined threshold, the signal D10 is set to 1. Otherwise, the signal D10 is set to 0.

The switch unit 716 connects an output D12 to an input D1 or an output D13 to an input D1 depending on the signals D10 and D9. In the case where both signals D10 and D9 are 1, the output D12 is connected to the input D1. Otherwise, the output D13 is connected to the input D1.

A second cost comparator unit 714 takes the cost value D8, compares it with a third pre-determined threshold and outputs a signal D11 to a second switch unit 718. In the case where the calculated cost is smaller than the third pre-determined threshold, the signal D11 is set to 1. Otherwise, the signal D11 is set to 0.

The switch unit 718 connects an output D14 to an input D13 or an output D15 to the input D13 depending on the signal D11. In the case where the signal D11 is 1, the output D14 is connected to the input D13. Otherwise, the output D15 is connected to the input D13.

The picture blending unit 720 takes one of the following inputs: N×M blocks of prediction samples D7; and N×M blocks of decoded samples from either D14 or D12 whichever is signaled, and performs a picture blending process. The picture blending unit then outputs N×M blocks of modified samples D16 to the OR gate unit. The OR gate unit 722 selects one of the N×M blocks of modified samples D16 and the N×M blocks of decoded samples D15 depending on which signal is available, and outputs, to the display Vout, the selected one of the N×M blocks of modified samples D16 and the N×M blocks of decoded samples D15.

As described above, according to the third embodiment of the present invention, a process for blending a current decoded picture obtained by decoding the coded picture coded by intra-predictive coding and a previous decoded picture is executed in the case where the correlation between the current decoded picture and the previous decoded picture is judged to be high. This makes it possible to carry over the coding characteristics in the previous GOP to the current GOP, and thus to reduce pulsing artifacts which occur between the two GOPs. Thus, it becomes possible to improve the visual quality of the pictures.

Descriptions have been given of the embodiments of the video coding apparatus, video coding method and video decoding apparatus of the present invention. However, the present invention is not limited to these embodiments. Those skilled in the art will readily appreciate that various modifications and combined embodiments where some structural elements in different exemplary embodiments are possible without materially departing from the novel teachings and advantages of this invention. Accordingly, all such modifications are intended to be included within the scope of this invention.

In addition, the present invention is structured so that a correlation judging process and a picture blending process are performed using the current picture to be coded by intra-predictive coding and the previous picture immediately-before the current picture. However, two or more previous pictures may be used. In this case, weighting coefficients for these two previous pictures may be set when weighted addition is performed in the correlation judging process and picture blending process. For example, such picture blending is executed based on the following Expression 7.

$$\text{Mod }[N,M]=(O[N,M]*W1+P1[N,M]*W2+P2[N,M]*W3+K)>>S \quad \text{[Expression 7]}$$

Here, O[N,M] represents N×M blocks of original samples, P1[N,M] and P2[N,M] represent N×M blocks of prediction samples, and Mod [N,M] represents N×M blocks of modified samples. P1[N,M] is the sample block immediately-before O[1N,M], and P2 is a sample block immediately-before P1[N,M]. Here, for example, by setting the weighting coefficients W2 and W3 so that W2 becomes greater than W3, it becomes possible to execute the picture blending process in which prediction sample blocks which are temporally nearer to original sample blocks are weighted and characteristics of prediction sample blocks prior to the original sample blocks are introduced. This makes it possible to visually improve the picture quality.

In addition, the weighting coefficients used for picture blending may be changed depending on the cost value obtainable in the correlation calculation process. For example, in Expression 2, a weighting coefficient W1 multiplied with the value of an original sample block may be changed to a greater or smaller value as the cost value becomes smaller.

In addition, in the embodiments of the present invention, it is assumed that the correlation judging process and the picture blending process are executed on a 16×16 block basis. However, the unit to be processed is not limited to this. Such processes may be executed on an 8×8 or a 4×4 block basis. Furthermore, the correlation judging process and the picture blending process may be executed on a pixel basis. This makes it possible to execute each of the processes with a high accuracy, and thus to further improve the visual picture quality.

In addition, processes such as coding can be executed not only on a block or picture basis but also on various units basis. For example, intra-predictive coding may be executed on a slice-by-slice basis as shown in FIG. 11. FIG. 11 is a diagram showing an example where the slices to be subjected to intra-predictive coding are coded at shifted time points. The video coding method of the present invention is applicable to the video coding method, of the present invention, which is performed on a slice-by-slice basis as shown in the figure.

Note that the present invention may be implemented as a program causing a computer to execute the method having steps corresponding to the processing units which structure the apparatuses indicated in the respective embodiments. Further, the present invention may be implemented as the following: recoding media such as computer-readable CD-ROMs on which the program is recorded; and information, data or signals representing the program. Furthermore, the program, information, data and signals may be distributed via communication networks such as the Internet.

INDUSTRIAL APPLICABILITY

The present invention is applicable to an apparatus which improves visual quality of pictures by reducing pulsing artifacts, and for example, applicable to digital televisions.

What is claimed is:

1. A video coding apparatus for reducing pulsing artifacts, said video coding apparatus comprising:
a correlation calculation unit calculating a correlation value indicating a degree of correlation between a first block and one of a second block and a third block, the first block including one or more pixels included in a first original picture in an original picture sequence of original pictures, the second block including one or more pixels included in a second original picture preceding the first original picture, and the third block being a reconstructed version of the second block obtained by coding and reconstructing the second block;
a correlation judgment unit judging whether the correlation value exceeds a pre-determined first threshold, and judging that the correlation value is high when the correlation value exceeds the pre-determined first threshold;
a blending unit blending the first block and the third block when said correlation judgment unit judges that the correlation value is high; and
a coding unit (i) coding the first block of the first original picture when said correlation judgment unit judges that the correlation value is not high, and (ii) coding, as the first block of the first original picture, a block resulting from the blending performed by said blending unit when said correlation judgment unit judges that the correlation value is high.

2. The video coding apparatus according to claim 1, wherein said coding unit performs intra-predictive coding on the block resulting from the blending performed by said blending unit.

3. The video coding apparatus according to claim 1, wherein said correlation calculation unit calculates a differential value between a pixel value of the first block and a pixel value of one of the second block and the third block, and said correlation judgment unit judges that the correlation value is high when the differential value is smaller than a pre-determined second threshold.

4. The video coding apparatus according to claim 3, further comprising:
- a detection unit detecting a motion vector in one of the second block and the third block; and
- a threshold setting unit selectively setting the following as the pre-determined second threshold:
  - a first value, when an absolute value of the motion vector is equal to or greater than a pre-determined third threshold; and
  - a second value greater than the first value, when the absolute value is smaller than the pre-determined third threshold,
- wherein said correlation judgment unit judges that the correlation value is high when the differential value is smaller than the pre-determined second threshold set by said threshold setting unit.

5. The video coding apparatus according to claim 1,
wherein said correlation calculation unit:
- calculates a sum of absolute differences of the first block and one of the second block and the third block;
- estimates a third value determined depending on a motion vector in one of the second block and the third block; and
- performs weighted addition of the sum of absolute differences and the third value, so as to calculate the correlation value indicating the degree of correlation, and
- wherein said correlation judgment unit judges that the correlation value is high when the calculated correlation value is judged to be smaller than a pre-determined fourth value.

6. The video coding apparatus according to claim 1, wherein said blending unit performs weighted addition of one or more pixel values included in the first block and one or more pixel values included in the third block.

7. A video coding method for reducing pulsing artifacts, said video coding method comprising:
- calculating a correlation value indicating a degree of correlation between a first block and one of a second block and a third block, the first block including one or more pixels included in a first original picture in an original picture sequence of original pictures, the second block including one or more pixels included in a second original picture preceding the first original picture, and the third block being a reconstructed version of the second block obtained by coding and reconstructing the second block;
- judging whether the correlation value exceeds a pre-determined first threshold, and judging that the correlation value is high when the correlation value exceeds the pre-determined first threshold;
- blending the first block and the third block when the correlation value is judged to be high in said judging;
- coding the first block of the first original picture when said judging judges that the correlation value is not high; and
- coding, as the first block of the first original picture, a block resulting from the blending performed in said blending of the first block and the third block when said judging judges that the correlation value is high.

8. The video coding method according to claim 7, wherein, in said coding, intra-predictive coding is performed on the block resulting from the blending performed in said blending of the first block and the third block.

9. The video coding method according to claim 7,
wherein said calculating includes calculating a differential value between a pixel value of the first block and a pixel value of one of the second block and the third block, and
wherein said judging includes judging that the correlation value is high when the differential value is smaller than a pre-determined second threshold.

10. The video coding method according to claim 9, further comprising:
- detecting a motion vector in one of the second block and the third block; and
- selectively setting the following as the pre-determined second threshold:
  - a first value, when an absolute value of the motion vector is equal to or greater than a pre-determined third threshold; and
  - a second value greater than the first value, when the absolute value is smaller than the pre-determined third threshold,
- wherein, said judging includes judging that the correlation value is high when the differential value is smaller than the pre-determined second threshold set in said selectively setting of the pre-determined second threshold.

11. The video coding method according to claim 7,
wherein said calculating includes:
- calculating a sum of absolute differences of the first block and one of the second block and the third block;
- calculating a third value determined depending on a motion vector in one of the second block and the third block; and
- performing weighted addition of the sum of absolute differences and the third value, so as to calculate the correlation value indicating the degree of correlation, and
- wherein said judging includes judging that the correlation value is high when the correlation value calculated in said performing of weighted addition is judged to be smaller than a pre-determined fourth value.

12. The video coding method according to claim 7, wherein said blending includes performing weighted addition of one or more pixel values included in the first block and one or more pixel values included in the third block.

13. A non-transitory computer-readable recording medium having a video coding program recorded thereon, the video coding program being for reducing pulsing artifacts and causing a computer to execute a video coding method when the non-transitory computer-readable recording medium is loaded into the computer, the video coding method comprising:
- calculating a correlation value indicating a degree of correlation between a first block and one of a second block and a third block, the first block including one or more pixels included in a first original picture in an original picture sequence of original pictures, the second block including one or more pixels included in a second original picture preceding the first original picture, and the third block being a reconstructed version of the second block obtained by coding and reconstructing the second block;
- judging whether the correlation value exceeds a pre-determined first threshold, and judging that the correlation value is high when the correlation value exceeds the pre-determined first threshold;
- blending the first block and the third block when the correlation value is judged to be high in said judging;
- coding the first block of the first original picture when said judging judges that the correlation value is not high; and
- coding, as the first block of the first original picture, a block resulting from the blending performed in said blending of the first block and the third block when said judging judges that the correlation value is high.

14. A video decoding apparatus for reducing pulsing artifacts, said video decoding apparatus comprising:
- a decoding unit outputting a decoded video sequence including decoded pictures obtained by decoding coded pictures;
- a correlation calculation unit calculating a correlation value indicating a degree of correlation between a first block and a second block, the first block including one or more pixels included in a first decoded picture in the decoded video sequence, and the second block including one or more pixels included in a second coded picture preceding the first decoded picture;
- a correlation judgment unit judging whether the correlation value exceeds a pre-determined first threshold, and judging that the correlation value is high when the correlation value exceeds the pre-determined first threshold; and
- a blending unit blending the first block and the second block when said correlation judgment unit judges that the correlation value is high,
- wherein said decoding unit (i) outputs the decoded video sequence including the first block of the first decoded picture when said correlation judgment unit judges that the correlation value is not high, and (ii) outputs the decoded video sequence including, as the first block of the first decoded picture, a block resulting from the blending performed by said blending unit when said correlation judgment unit judges that the correlation value is high.

15. The video decoding apparatus according to claim 14, wherein said correlation calculation unit calculates the correlation value using, as the first block, a block obtained by decoding a block coded by intra-predictive coding.

16. The video decoding apparatus according to claim 14,
- wherein said correlation calculation unit calculates the correlation value by calculating a differential value between a pixel value in the first block and a pixel value in the second block, and
- wherein said correlation judgment unit judges that the correlation value is high when the differential value is smaller than a pre-determined second threshold.

17. The video decoding apparatus according to claim 16, further comprising:
- a motion estimation unit estimating a motion vector in the second block; and
- a threshold setting unit selectively setting the following as the pre-determined second threshold:
  - a first value, when an absolute value of the motion vector is equal to or greater than a pre-determined third threshold; and
  - a second value greater than the first value, when the absolute value is smaller than the pre-determined third threshold,
- wherein said correlation judgment unit judges that the correlation value is high when the differential value is smaller than the pre-determined second threshold set by said threshold setting unit.

18. The video decoding apparatus according to claim 14, wherein said correlation calculation unit:
- calculates a sum of absolute differences of the first block and the second block;
- estimates a third value determined depending on a motion vector in the second block; and
- performs weighted addition of the sum of absolute differences and the third value, so as to calculate the correlation value indicating the degree of correlation, and
- wherein said correlation judgment unit judges that the correlation value is high when the calculated correlation value is judged to be smaller than a pre-determined fourth threshold.

19. The video decoding apparatus according to claim 14, wherein said blending unit performs weighted addition of one or more pixel values included in the first block and one or more pixel values included in the second block.

20. A picture blending apparatus blending pictures, so as to reduce pulsing artifacts, said picture blending apparatus comprising:
- a correlation calculation unit calculating a correlation value indicating a degree of correlation between a first block and a second block, the first block including one or more pixels included in a first picture in a video sequence of pictures, and the second block including one or more pixels included in a second picture preceding the first picture;
- a correlation judgment unit judging whether the correlation value exceeds a pre-determined threshold, and judging that the correlation value is high when the correlation value exceeds the pre-determined threshold; and
- a blending unit (i) outputting the first block of the first picture when said correlation judgment unit judges that the correlation value is not high, and (ii) when said correlation judgment unit judges that the correlation value is high, blending the first block and one of the second block and a third block obtained from the second block, and outputting a block resulting from the blending, as the first block of the first picture.

* * * * *